(12) United States Patent
Zhang et al.

(10) Patent No.: US 8,355,257 B2
(45) Date of Patent: Jan. 15, 2013

(54) COMPUTER SYSTEM

(75) Inventors: Jing Zhang, Shanghai (CN); Tsu-Cheng Lin, Taipei (TW)

(73) Assignee: Inventec Corporation, Taipei (TW)

( * ) Notice: Subject to any disclaimer, the term of this patent is extended or adjusted under 35 U.S.C. 154(b) by 235 days.

(21) Appl. No.: 12/793,963

(22) Filed: Jun. 4, 2010

(65) Prior Publication Data

US 2011/0273833 A1    Nov. 10, 2011

(30) Foreign Application Priority Data

May 5, 2010    (CN) .......................... 2010 1 0165417

(51) Int. Cl.
*H05K 7/00* (2006.01)
(52) U.S. Cl. ............... 361/728; 361/679.01; 361/679.02
(58) Field of Classification Search ............. 361/679.01, 361/679.02, 679.4, 679.6, 679.31, 679.32, 361/679.33, 679.37, 679.58, 725–730, 736, 361/748, 760, 784, 785, 788, 791, 799, 803; 439/43, 44, 55, 59, 61, 65, 78, 79, 296, 345, 439/347, 928; 710/1, 100, 300, 301, 305
See application file for complete search history.

(56) References Cited

U.S. PATENT DOCUMENTS

| | | | | |
|---|---|---|---|---|
| 8,055,920 B2* | 11/2011 | Huang et al. | .................. | 713/300 |
| 8,112,513 B2* | 2/2012 | Margulis | ....................... | 709/224 |
| 2010/0013839 A1* | 1/2010 | Rawson | ....................... | 345/502 |
| 2010/0125655 A1* | 5/2010 | Elzur | ............................ | 709/223 |

* cited by examiner

*Primary Examiner* — Hung S Bui
(74) *Attorney, Agent, or Firm* — J.C. Patents

(57) ABSTRACT

A computer system adapted to connect a plurality of external servers is provided. The computer system includes a motherboard module, a power supply module, a baseboard management controller (BMC), a control module and a plurality of graphics processing units (GPUs). The motherboard module includes a plurality of first connectors and a plurality of second connectors, wherein the second connectors are respectively connected to the external servers. The power supply module is coupled to the motherboard module for supplying power to the computer system. The control module is disposed on the motherboard module, and the control module manages corresponding relations of the first connectors and the second connectors, and controls the power supply module to supply power to the first connectors. The GPUs are respectively coupled to the first connectors. Each of the GPUs correspondingly expands a computing capability of the external server through the corresponding second connector.

10 Claims, 1 Drawing Sheet

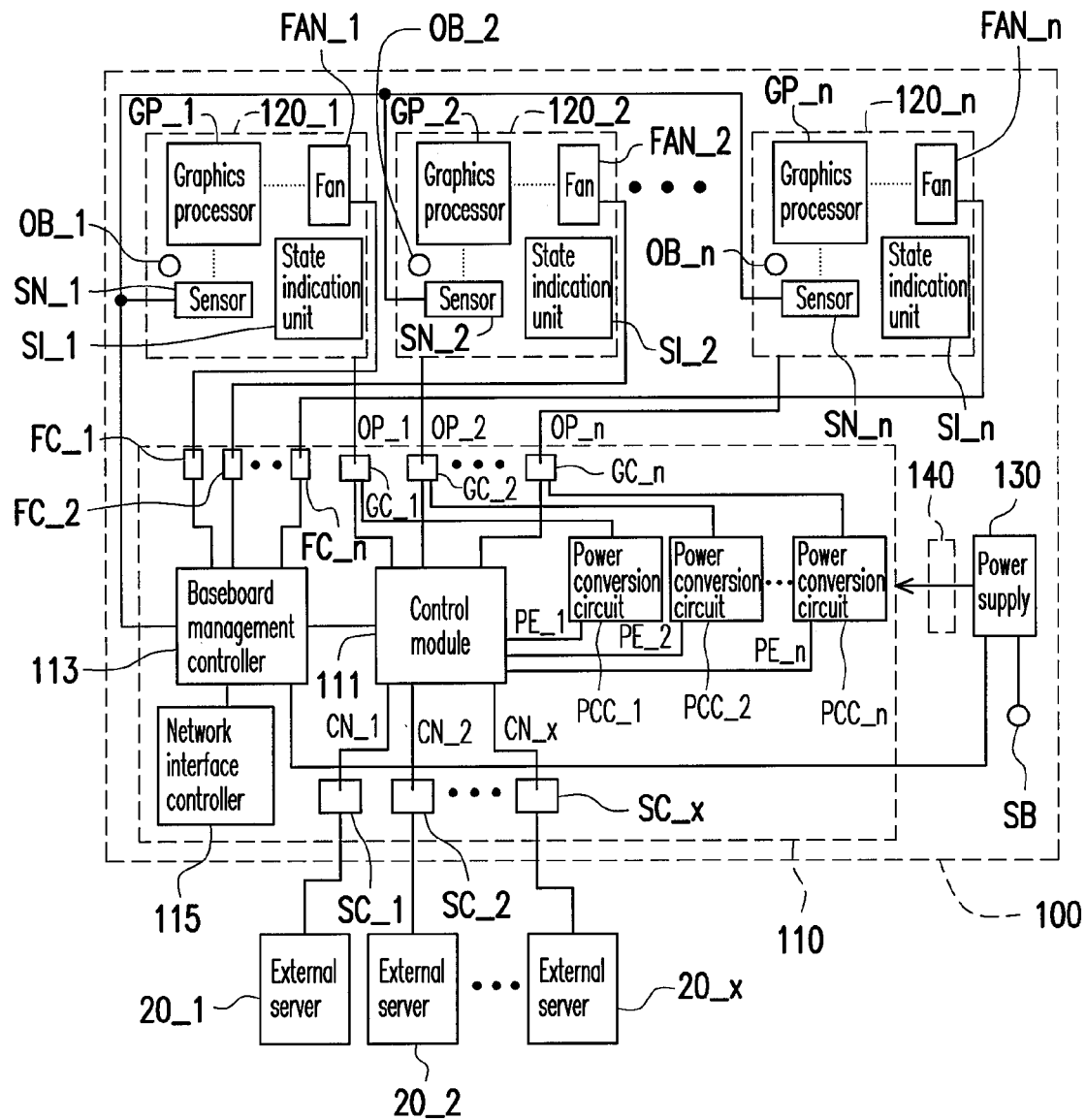

COMPUTER SYSTEM

CROSS-REFERENCE TO RELATED APPLICATION

This application claims the priority benefit of P.R.C. patent application serial no. 201010165417.5, filed on May 5, 2010. The entirety of the above-mentioned patent application is hereby incorporated by reference herein and made a part of specification.

BACKGROUND OF THE INVENTION

1. Field of the Invention

The present invention relates to a computer system. More particularly, the present invention relates to a computer system supporting a plurality of servers.

2. Description of Related Art

With a quick development of computer system technology, a graphics processing unit (GPU) can share computing tasks such as graphics processing and image processing, etc. of a central processing unit (CPU), so that the CPU has more time to handle the other computing procedures, so as to improve an operation speed of the whole computer system.

In a present computer or server, a motherboard generally has hardware such as a CPU, a hard disk driver and a memory, etc., and each motherboard is only installed with one display card. Therefore, when a large amount of graphics computing processing is required to be executed by the server, only the display card and the CPU installed on the server carry on the computing processing to share a computing burden of the server, and a number of the installed display cards can not be selected. Moreover, if the display card on the motherboard is damaged, a user can only maintain an operation of the computer system by replacing the display card or replacing the whole motherboard, so that it has a poor expansibility.

SUMMARY

The invention is directed to a computer system, which can expand computing capabilities of external servers.

The invention provides a computer system, which is adapted to connect a plurality of external servers. The computer system includes a motherboard module, a power supply module, a baseboard management controller, a control module and a plurality of graphics processing units (GPUs). The motherboard module includes a plurality of first connectors and a plurality of second connectors, wherein the second connectors are respectively connected to the external servers. The power supply module is coupled to the motherboard module for supplying power to the computer system. The control module is disposed on the motherboard module, and the control module manages corresponding relations of the first connectors and the second connectors, and controls the power supply module to supply power to the first connectors. The GPUs are respectively coupled to the first connectors. The GPUs correspondingly expand computing capabilities of the external servers through the corresponding second connectors.

In an exemplary embodiment of the invention, the computer system further includes a system turning on/off button, which controls the power supply module to supply power to the computer system.

In an exemplary embodiment of the invention, the computer system further includes a baseboard management controller (BMC), which is disposed on the motherboard module for monitoring and managing a working state of the computer system.

In an exemplary embodiment of the invention, the motherboard module includes a network interface controller (NIC), which is coupled to the BMC. The BMC receives a remote control command through the NIC, and executes the remote control command.

In an exemplary embodiment of the invention, the remote control command is a remote start command, a remote shutdown command or a remote query command.

In an exemplary embodiment of the invention, the computer system further includes a plurality of fans, and the fans are respectively coupled to a plurality of fan connectors on the motherboard module. The BMC controls rotation speeds of the fans through the fan connectors.

In an exemplary embodiment of the invention, the computer system further includes a plurality of temperature sensors respectively disposed on the GPUs and the motherboard module. The BMC is coupled to the temperature sensors, and controls the rotation speeds of the fans according to temperature information of the temperature sensors.

In an exemplary embodiment of the invention, the GPUs respectively have a start button, and when the start button of the GPU is pressed, the GPU sends a start signal to the control module.

In an exemplary embodiment of the invention, when any of the external servers is connected to one of the second connectors, a connecting signal is generated to the control module. The control module activates the corresponding first connector according to the connecting signal. Each of the GPUs sends the start signal when the start button thereof is pressed and the corresponding first connector is in an active state.

In an exemplary embodiment of the invention, each of the GPUs is coupled to a power conversion circuit. The power conversion circuits are electrically connected to the power supply module. The control module correspondingly sends a power enabling signal according to the start signal of any of the GPUs to enable the corresponding power conversion circuit, so as to supply power to the corresponding GPU to start the corresponding GPU.

In an exemplary embodiment of the invention, the GPUs respectively have a state indication unit. When the corresponding first connector is not activated, the state indication unit indicates a disable state, when the corresponding first connector is in the active state, the state indication unit indicates a standby state, and when the GPU is started, the state indication unit indicates a use state.

According to the above descriptions, the computer system of the invention can correspondingly connect the external servers and the GPUs, so as to expand the computing capabilities of the external servers through the GPUs.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a system schematic diagram illustrating a computer system coupled to external servers according to an exemplary embodiment of the invention.

DETAILED DESCRIPTION OF DISCLOSED EMBODIMENTS

FIG. 1 is a system schematic diagram illustrating a computer system coupled to external servers according to an exemplary embodiment of the invention. Referring to FIG. 1, in the present exemplary embodiment, the computer system 100 includes a motherboard module 110, a plurality of graphics processing units (GPUs) 120_1~120_n, a power supply module (i.e. a power supply 130 and a power backplane 140) and a system turning on/off button SB, wherein n is a positive integer, and the power supply module is, for example, consisted of the power supply 130 and the power backplane 140, through the invention is not limited thereto. It is a selective connecting method that the power supply 130 is electrically connected to the motherboard module 110 through the power backplane 140, and the power supply 130 can be directly connected to the motherboard 110 to supply power to the computer system 100. The system turning on/off button SB controls the power supply 130 to supply power to the computer system 100, so as to turn on/off the computer system 100.

The motherboard module 110 includes a control module 111, a baseboard management controller (BMC) 113, a network interface controller (NIC) 115, first connectors GC_1~GC_n second connectors SC_1~SC_x fan connectors FC_1~FC_n and power conversion circuits PCC_1~PCC_n, wherein x and n are positive integers. The BMC 113 is used for monitoring and managing a working state of the computer system 100. The control module 111 is turned on or turned off through the system turning on/off button SB. The power conversion circuits PCC_1~PCC_n are electrically connected to the power supply 130 for receiving power energy from the power supply 130.

The first connectors GC_1~GC_n and the second connectors SC_1~SC_x are respectively coupled to the control module 111, the NIC 115 is coupled to the BMC 113, and the BMC 113 is coupled to the control module 111. Each of the GPUs includes a graphics processor, a sensor, a start button and a state indication unit. The GPU 120_1 includes a graphics processor GP_1, a sensor SN_1, a start button OB_1 and a state indication unit SI_1, wherein the sensor SN_1 is a temperature sensor. The GPU 120_2 includes a graphics processor GP_2, a sensor SN_2, a start button OB_2 and a state indication unit SI_2, wherein the sensor SN_2 is also a temperature sensor. Formations of the GPU 120_1~120_n can be deduced by analogy, and detailed formations thereof are not repeated.

The control module 111 receives power energy from the power supply 130, and supplies power to the first connectors GC_1~GC_n by using the power energy of the power supply 130. Moreover, the control module 111 manages corresponding relations of the first connectors GC_1~GC_n and the second connectors SC_1~SC_x. For example, if n is equal to 2x, each of the second connectors (for example, SC_1~SC_x) corresponds to two first connectors (for example, GC_1~GC_n), namely, the second connector SC_1 corresponds to the first connectors GC_1~GC_2, and the second connector SC_2 corresponds to the first connectors GC_3~GC_4, and the others are deduced by analogy.

Moreover, the first connectors GC_1~GC_n are respectively coupled to the GPUs 120_1~120_n, and the second connectors SC_1~SC_x are respectively connected to external servers 20_1~20_x. Base on the corresponding relations of the first connectors GC_1~GC_n and the second connectors SC_1~SC_x the external servers 20_1~20_x are electrically connected to the corresponding GPUs 120_1~120_n, and computing capabilities of the external servers 20_1~20_x are expanded through the corresponding GPUs. In other words, the GPUs 120_1~120_n correspondingly expand the computing capabilities of the external servers 20_1~20_x through the corresponding second connectors SC_1~SC_x. Moreover, the GPUs 120_1~120_n are respectively coupled to the power conversion circuits PCC_1~PCC_n through the first connectors GC_1~GC_n.

Further, when the external server 20_1 is connected to the second connector SC_1, a connecting signal CN_1 is generated to the control module 111. Now, the control module 111 activates the first connectors GC_1~GC_2 according to the connecting signal CN_1 and supplies power to the first connectors GC_1~GC_2. When the first connectors GC_1~GC_2 are activated and in an active state, the state indication units SI_1~SI_2 of the GPUs 120_1~120_2 coupled to the first connectors GC_1~G_C 2 respectively indicate that the GPUs 120_1~120_2 are in a standby state. Conversely, when the first connectors GC_1~GC_2 are not activated, the state indication units SI_1~SI_2 of the GPUs 120_1~120_2 coupled to the first connectors GC_1~G_C 2 respectively indicate that the GPUs 120_1~120_2 are in a disable state. Wherein, state-indication can be implemented through a light-emitting device, for example, a light-emitting diode, so as to intuitively notify a working state of the GPU to a user.

When the GPUs 120_1~120_2 are in the standby state, the start buttons OB_1~OB_2 can be pressed to activate the GPUs 120_1~120_2, and then the GPUs 120_1~120_2 are activated and send start signals OP_1~OP_2 to the control module 111, and the state indication units SI_1~SI_2 indicate that the GPUs 120_1~120_2 are in a use state.

When the control module 111 receives the start signal OP_1, the control module 111 sends a power enabling signal PE_1 to enable the power conversion circuit PCC_1, so that the power conversion circuit PCC_1 supplies power to the GPU 120_1 through the first connector GC_1 to start the GPU 120_1. In this way, the control module 111 can control the power supply 130 to supply power to the first connector GC_1 through the power conversion circuit PCC_1. According to the above descriptions, when the control module 111 receives the start signal OP_2, the control module 111 also sends a power enabling signal PE_2 to enable the power conversion circuit PCC_2, so that the power conversion circuit PCC_2 supplies power to the GPU 120_2 through the first connector GC_2 to start the GPU 120_2. The others are deduced by analogy, and detailed descriptions thereof are not repeated. In this way, the control module 111 can control the power supply 130 to supply power to the first connectors GC_2~GC_n through the power conversion circuits PCC_2~PCC_n. Now, the external server 20_1 is coupled to the GPUs 120_1~120_2 through the second connector SC_1, the control module 111 and the first connectors GC_1~GC_2, and the computing capability of the external server 20_1 is expanded through the GPUs 120_1~120_2. Meanwhile, the GPUs do not occupy a space of the server, so that an expansion convenience is improved.

According to the above descriptions, when the external server 20_2 is connected to the second connector SC_2, circuit operations thereof are similar as that when the external server 20_1 is connected to the second connector SC_1, so that detailed descriptions thereof are not repeated, and circuit operations generated when the other external servers (for example, 20_3~20_n) are connected to the second connectors (for example, SC_3~SC_n) can be deduced by analogy.

It should be noticed that in the above exemplary embodiment, one external server corresponds to one second connector is taken as an example. Generally, one external server usually has more than one motherboard, and if the external server has more than two motherboards, one external server can correspond to more than two second connectors. Namely, in the other exemplary embodiments, one external server corresponds to more than two connectors, while a number of the corresponding second connectors is determined according to the used external server, which is not limited by the invention.

On the other hand, if the GPUs 120_1~120_n are display cards, the first connectors GC_1~GC_n are slots, so that the GPUs 120_1~120_n can be inserted into the slots for connecting the motherboard module 110. If pins of the GPUs 120_1~120_n are peripheral component interconnection express (PCIE) pins, the first connectors GC_1~GC_n are PCIE slots, and the second connectors SC_1~SC_x are PCIE ports, which are electrically connected to the external servers 20_1~20_x through external PCIE cables.

The fan connectors FC_1~FC_n are respectively coupled to fans FAN_1~FAN_n on the GPUs 120_1~120_n, so that the BMC 113 can control rotation speeds of the fans FAN_1~FAN_n through the fan connectors FC_1~FC_n, so as to adjust temperatures of the graphics processors GP_1~GP_n. Moreover, the BMC 113 is coupled to sensors SN_1~SN_n on the GPUs 120_1~120_n, and correspondingly adjusts the rotation speeds of the fans FAN_1~FAN_n according to a fan control table and temperature information transmitted by the sensors SN_1~SN_n, wherein the temperature information transmitted by the sensors SN_1~SN_n are respectively results obtained by measuring the temperatures of the graphics processors GP_1~GP_n, and the BMC 113 can read the temperature information of the sensors SN_1~SN_n through an inter-integrated circuit (I2C) interface.

Moreover, in other exemplary embodiments, the fans FAN_1~FAN_n can be unitedly configured at a side of the computer system 100, and can synchronously cool down the graphics processors GP_1~GP_n and the motherboard module 100. Now, the fans FAN_1~FAN_n are not one-to-one corresponding to the graphics processors GP_1~G_P_n. Moreover, a temperature sensor can be further configured on the motherboard module 110 to measure temperature information of the motherboard module 110. Then, the rotation speeds of the fans FAN_1~FAN_n can be adjusted according to the temperatures of the graphics processors GP_1~GP_n, the temperature of the motherboard module 110 and the fan control table.

The NIC 115 is connected to a network (for example, a wireless network or a cable network), so as to receive a remote control command from a remote end through the network. The BMC 113 receives the remote control command through the NIC 115, and executes the remote control command. For example, if the remote control command is a remote start command, the BMC 113 controls the power supply 130 to supply power to the computer system 100 according to the remote start command, so that the computer system 100 is in a start state. If the remote control command is a remote shutdown command, the BMC 113 controls the power supply 130 to stop supplying power to the computer system 100 according to the remote shutdown command, so that the computer system 100 is in a shutdown state. If the remote control command is a remote query command, the BMC 113 transmits an operation state of the computer system 100 (for example, log information) to the remote end through the network. In this way, a remote control function is implemented.

In summary, in the computer system of the invention, the external servers and the GPUs can be correspondingly connected to expand the computing capabilities of the external servers through the GPUs. Moreover, the BMC can correspondingly adjust the rotation speeds of the fans according to the GPU temperatures measured by the sensors. In addition, the computer system can receive remote control commands to execute operations such as booting, shutdown and state inquiry, so as to implement the remote control function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, adapted to connect a plurality of external servers, and the computer system comprising:
    a motherboard module, having a plurality of first connectors and a plurality of second connectors, wherein the second connectors are respectively connected to the external servers;
    a power supply module, coupled to the motherboard module for supplying power to the computer system;
    a control module, disposed on the motherboard module, for managing corresponding relations of the first connectors and the second connectors, and controlling the power supply module to supply power to the first connectors; and
    a plurality of graphics processing units (GPUs), respectively coupled to the first connectors, wherein the GPUs correspondingly expand computing capabilities of the external servers through the corresponding second connectors, wherein each of the GPUs has a start button, and when the start button of any of the GPUs is pressed, the GPU sends a start signal to the control module.

2. The computer system as claimed in claim 1, further comprising a system turning on/off button for turning on/off the control module, so as to control the power supply module to supply power to the computer system.

3. The computer system as claimed in claim 1, further comprising a baseboard management controller (BMC) disposed on the motherboard module for monitoring and managing a working state of the computer system.

4. The computer system as claimed in claim 3, wherein the motherboard module further comprises a network interface controller (NIC) coupled to the BMC, and the BMC receives a remote control command through the NIC, and executes the remote control command.

5. The computer system as claimed in claim 4, wherein the remote control command is a remote start command, a remote shutdown command or a remote query command.

6. The computer system as claimed in claim 3, further comprising a plurality of fans, wherein the fans are respectively coupled to a plurality of fan connectors on the motherboard module, and the BMC controls rotation speeds of the fans through the fan connectors.

7. The computer system as claimed in claim 6, further comprising a plurality of temperature sensors respectively disposed on the GPUs and the motherboard module, wherein the BMC is coupled to the temperature sensors, and controls the rotation speeds of the fans according to temperature information of the temperature sensors.

8. The computer system as claimed in claim 1, wherein each of the GPUs is coupled to a power conversion circuit, the power conversion circuits are electrically connected to the power supply module, the control module correspondingly sends a power enabling signal according to the start signal of any of the GPUs to enable the corresponding power conversion circuit, so as to supply power to the corresponding GPU to start the corresponding GPU.

9. The computer system as claimed in claim 1, wherein when any of the external servers is connected to one of the second connectors, a connecting signal is generated to the control module, the control module activates the corresponding first connector according to the connecting signal, and each of the GPUs sends the start signal when the start button thereof is pressed and the corresponding first connector is in an active state.

10. The computer system as claimed in claim 9, wherein each of the GPUs has a state indication unit, when the corresponding first connector is not activated, the state indication unit indicates a disable state, when the corresponding first connector is in the active state, the state indication unit indicates a standby state, and when the GPU is started, the state indication unit indicates a use state.

* * * * *